(12) United States Patent
Wigglesworth et al.

(10) Patent No.: US 10,030,170 B2
(45) Date of Patent: Jul. 24, 2018

(54) WEAR RESISTANT TRANSPARENT COATING

(71) Applicant: Xerox Corporation, Norwalk, CT (US)

(72) Inventors: Tony J. Wigglesworth, Oakville (CA); Adrien Pierre Côté, Mississauga (CA); Brynn Mary Dooley, Toronto (CA)

(73) Assignee: Xerox Corporation, Norwalk, CT (US)

( * ) Notice: Subject to any disclaimer, the term of this patent is extended or adjusted under 35 U.S.C. 154(b) by 830 days.

(21) Appl. No.: 14/187,468

(22) Filed: Feb. 24, 2014

(65) Prior Publication Data

US 2015/0240126 A1 Aug. 27, 2015

(51) Int. Cl.
*C09D 183/08* (2006.01)
*C08G 77/24* (2006.01)

(52) U.S. Cl.
CPC ............ *C09D 183/08* (2013.01); *C08G 77/24* (2013.01); *Y10T 428/265* (2015.01); *Y10T 428/31612* (2015.04)

(58) Field of Classification Search
CPC ........ C08G 77/24; C09D 4/00; C09D 183/08; Y10T 428/265; Y10T 428/31612
USPC ......... 427/387; 428/220, 336, 429; 524/588; 528/33–37, 42
See application file for complete search history.

(56) References Cited

U.S. PATENT DOCUMENTS

| | | | | |
|---|---|---|---|---|
| 5,677,410 A | * | 10/1997 | Mager | .................. C07F 7/0836 528/15 |
| 2006/0078717 A1 | * | 4/2006 | Yamaya | ................. C08G 77/50 428/212 |
| 2006/0207967 A1 | * | 9/2006 | Bocko | ....................... B32B 7/06 216/24 |
| 2010/0264266 A1 | | 10/2010 | Tsotsis | |
| 2012/0208421 A1 | | 8/2012 | Qi et al. | |
| 2012/0224897 A1 | | 9/2012 | Qi et al. | |

OTHER PUBLICATIONS

U.S. Appl. No. 14/082,801, Office Action 1 dated Feb. 1, 2017, 28 pages.
U.S. Appl. No. 14/082,811, Office Action 1 dated Feb. 1, 2017, 29 pages.

* cited by examiner

*Primary Examiner* — Maria V Ewald
*Assistant Examiner* — Ethan Weydemeyer
(74) *Attorney, Agent, or Firm* — Hoffman Warnick LLC

(57) ABSTRACT

The present disclosure provides a transparent cross-linked siloxane composition. The composition is a polymerization product of a mixture of a difunctional alkoxysilane precursor materials and a monofunctional alkoxysilane material. The monofunctional alkoxysilane material is from about 1 weight percent to about 50 weight percent of the composition. The mole ratio of the monofunctional alkoxysilane materials to difunctional alkoxysilane precursor materials is from 1 to 4 to about 1 to 1.

7 Claims, 1 Drawing Sheet

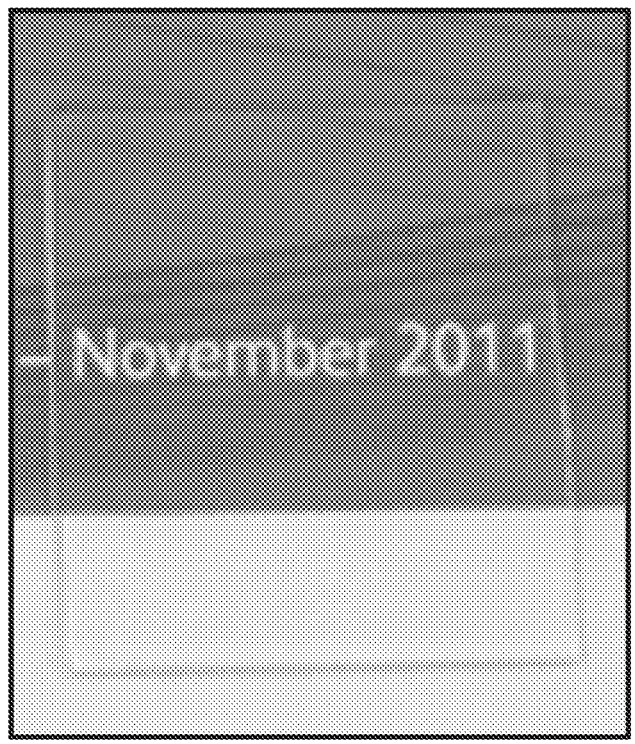

WEAR RESISTANT TRANSPARENT COATING

FIELD OF USE

The present disclosure is generally related, in various embodiments, to transparent coatings that are resistant to wear and degradation.

BACKGROUND

Capacitive touch screen displays are found in a wide range of consumer products such as smart phones, tablets, key pads, computers, multifunction devices and electronic devices found in the field such as digital parking terminals and Automatic Teller Machines (ATMs). These products, which are in daily use by the public, can be become easily fouled with fingerprints and dust which makes the displays of these products difficult to read. The products and associated displays can require frequent cleaning to maintain their usability. Therefore, major electronics manufacturers desire fingerprint resistant coatings for touchable devices such as the smart phones and tablets. Fingerprint resistant coatings for touchable devices are more resilient to daily use and much easier to clean by simply wiping with microfiber cloth. However a major problem with these coatings is that they are not mechanically robust and can wear off in short time frames. What is currently required is a chemically inert and mechanically robust coating that is resistant to fouling by fingerprints, dust, oil and water, can be easily cleaned and maintain their function throughout the lifetime of the device As such, there is desired a formulation composition durable coatings that can be easily shaped or imprinted.

SUMMARY

The present disclosure provides a transparent cross-linked siloxane composition. The composition is a polymerization product of a mixture of a difunctional alkoxysilane precursor materials and a monofunctional alkoxysilane material. The monofunctional alkoxysilane material is from about 1 weight percent to about 50 weight percent of the composition. The mole ratio of the monofunctional alkoxysilane materials to difunctional alkoxysilane precursor materials is from 1 to 4 to about 1 to 1.

In embodiments, the present disclosure further provides a transparent surface layer. The transparent surface is a siloxyfluorocarbon networked polymer formed from a first monomer represented by:

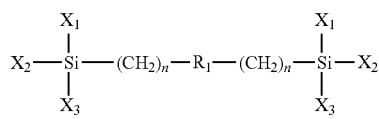

and a second monomer represented by:

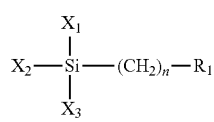

wherein n is from about 0 to about 4, $R_1$ is a linear or branched perfluorinated hydrocarbon group, a linear or branched partially fluorinated hydrocarbon group, a linear or branched perfluorinated polyether group, a linear or branched partially fluorinated polyether group, a linear or branched perfluorinated polyester group, a linear or branched partially fluorinated polyester group; and $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms. All the monomers are bonded together via silicon oxide (Si—O—Si) linkages in a single system. The siloxyfluorocarbon networked polymer is insoluble in solvents selected from the group consisting of ketones, chlorinated solvents and ethers.

In embodiments, the present disclosure also provides a display including a substrate; and a transparent surface layer disposed on the transparent substrate. The transparent surface layer includes a siloxyfluorocarbon networked polymer formed from a first monomer represented by:

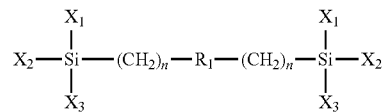

and a second monomer represented by:

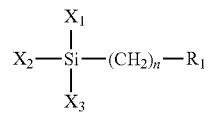

wherein n is from about 0 to about 4, $R_1$ is a linear or branched perfluorinated hydrocarbon group, a linear or branched partially fluorinated hydrocarbon group, a linear or branched perfluorinated polyether group, a linear or branched partially fluorinated polyether group, a linear or branched perfluorinated polyester group, a linear or branched partially fluorinated polyester group; and $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms. All the monomers are bonded together via silicon oxide (Si—O—Si) linkages in a single system. The siloxyfluorocarbon networked polymer is insoluble in solvents selected from the group consisting of ketones, chlorinated solvents and ethers.

BRIEF DESCRIPTION OF THE DRAWINGS

FIG. 1 is a coating disclosed herein disposed on the quartz substrate.

It should be noted that some details of the figures have been simplified and are drawn to facilitate understanding of the embodiments rather than to maintain strict structural accuracy, detail, and scale.

DESCRIPTION OF THE EMBODIMENTS

In this specification and the claims that follow, singular forms such as "a," "an," and "the" include plural forms unless the content clearly dictates otherwise.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The terms "hydrocarbon" and "alkane" refer, for example, to branched and unbranched molecules having the general formula $C_nH_{2n+2}$, in which n is a number of 1 or more, such as from about 1 to about 60, or from about 2 to about 30, or from about 4 to about 20. Exemplary alkanes include methane, ethane, n-propane, isopropane, n-butane, isobutene, tort-butane, octane, decane, tetradecane, hexadecane, eicosane, tetracosane, and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

In general, fluorinated organosiloxane networks are highly cross-linked materials containing organic segments bound together via siloxane linkages. These materials exhibit high thermal robustness and high mechanical strength. The surface and mechanical properties of an organosiloxane network can be tailored for particular applications by selecting suitable building blocks and coating formulations. That is to say, the organosiloxane networks according to the instant disclosure are tunable materials whose properties can be varied through the selection of the type and amount of particular precursors used to produce the organosiloxane networks. The tunability of organosiloxane networks makes them attractive materials for durable coatings.

In embodiments, the formulation composition according to the instant disclosure may be applied to a surface as a stable wet layer. In embodiments, the formulation composition may be cured to form a cross-linked siloxane coating on the surface. The coatings produced by the methods of the instant disclosure are thermally robust. In addition, the coating produced according to the instant disclosure exhibits little no chemical interaction with typical solvents. Thus, the cross-linked siloxane coatings prepared according to the instant disclosure exhibit very low adhesion to foreign substances. The coatings produced according to the present disclosure are thermally stable, have anti-wetting and non-stick interactions. The coatings are also resistant to surface wear or damage.

In general, fluorinated organosiloxane networks are highly cross-linked materials containing organic segments bound together via siloxane linkages. These materials exhibit high thermal robustness and high mechanical strength. The surface and mechanical properties of a fluorinated organosiloxane network can be tailored for particular applications by selecting suitable building blocks and coating formulations. That is to say, the fluorinated organosiloxane networks according to the instant disclosure are tunable materials whose properties can be varied through the selection of the type and amount of particular precursors used to produce the fluorinated organosiloxane networks. The tunability of fluorinated organosiloxane networks makes them an attractive materials platform for anti-wetting coatings in general, such as anti-wetting coatings for inkjet face plates.

In embodiments, the formulation composition according to the instant disclosure may be applied to a surface as a stable wet layer. In embodiments, the formulation composition may be cured to form a siloxyfluorocarbon networked polymer on the surface of a display. The coatings produced by the methods of the instant disclosure are thermally robust and exhibit good solid ink anti-wetting characteristics. In addition, the coating produced according to the instant disclosure exhibits little or no chemical interaction with other chemicals.

The formulation compositions according to the instant disclosure may be applied to a variety of substrates, including stainless steel and polyimide, using a variety of solution-based processing methods (spray, dip, blade coatings), yielding a suitable thickness predetermined by the user. The formulation compositions may be selected to produce a siloxyfluorocarbon networked polymer or fluorinated organosiloxane network having strong adhesion to a given substrate without the need for surface modification or the use of promoters, allowing for a primer-free application.

The coatings disclosed herein have surface energy of less than 17 mN/m, or in embodiments less than 15 mN/m or less than 13 mN/m. The thickness of the coatings is from about 0.1 microns to about 4 microns, or in embodiments from about 0.2 microns to about 2 microns or from about 0.250 microns to about 1 microns.

The formulation compositions according to the instant disclosure may be applied to display screens to provide protection. The formulation compositions may be selected to produce an organosiloxane network having strong adhesion to a given substrate, such as glass or plastic without the need for surface modification or the use of promoters, allowing for a primer-free application.

Formulation Composition

The formulation composition disclosed herein is suitable for applications such as touch screen displays. The coating composition includes a sol-gel network which provides both the thermal and mechanical robustness. The anti-wetting and antifouling properties are introduced by cross-linking fluorinated hydrocarbon segments into the network material.

The formulation composition disclosed herein is a polymerization product of a mixture monosubstituted alkoxysilane precursor materials and disubstituted alkoxysilane precursor materials. In embodiments, monosubstituted alkoxysilane material are at from about 1 weight percent to about 50 weight percent of the formulation. In embodiments, the monosubstituted alkoxysilane material is from about 10 weight percent to about 40 weight percent of the formulation, or from about 15 weight percent to about 30 weight percent of the formulation. The monosubstituted alkoxysilane precursor provides "hairs" of fluorinated hydrocarbon chains that increase the hydrophobic characteristics of the polymer while remaining transparent.

In embodiments, the cross-linked siloxane composition or siloxyfluorocarbon networked polymer includes a mole ratio of mono substituted hydrophobic alkoxysilane precursor materials to disubstituted alkoxysilane precursor materials of from 1 to 4 to about 1 to 1.

The term hydrophobic (superhydrophobic) refers, for example, to the property of repelling water, or other polar species, such as methanol. Furthermore, hydrophobic implies an inability to form strong hydrogen bonds to water or other hydrogen bonding species. Hydrophobic materials are typically characterized by having water contact angles greater than 90° as measured using a contact angle goniometer or related device. Highly hydrophobic as used herein can be described as when a droplet of water forms a high contact angle with a surface, such as a contact angle of from about 130° to about 180°. Superhydrophobic as used herein can be described as when a droplet of water forms a high contact angle with a surface, such as a contact angle of greater than about 150°, or from greater about 150° to about 180°.

In embodiments, the hydrophobic precursors may independently vary in their number of alkoxy substitutions. For example, in embodiments, the hydrophobic alkoxysilane precursor materials may be monofunctional alkoxysilanes, such as trimethylmethoxysilane; difunctional alkoxysilanes such as dimethyldimethoxysilane, diphenyldimethoxysilane or methylphenyl-dimethoxysilane.

In embodiments, the hydrophobic alkoxysilane precursor material may be a linear or a branched hydrocarbon. In embodiments, the hydrophobic alkoxysilane precursors may include siloxyfluorocarbon (SFC) precursors. SFC precursors are designed to incorporate fluorinated chains that add flexibility and low-surface energy character to the resulting material. A variety of SFC precursors with varying siloxane and fluorocarbon components may be used to prepare OSN coatings, including mono and di-alkoxy silanes, linear and branched fluoroalkanes, and fluoroarenes.

In embodiments, the disubstituted hydrophobic alkoxysilane precursor material may be represented by the structure:

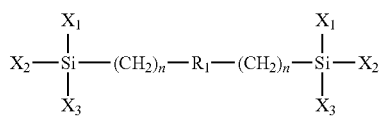

wherein n is from about 0 to about 4 $R_1$ is a linear or branched perfluorinated hydrocarbon group, a linear or branched partially fluorinated hydrocarbon group, a linear or branched perfluorinated polyether group, a linear or branched partially fluorinated polyether group, a linear or branched perfluorinated polyester group, a linear or branched partially fluorinated polyester group; and $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms.

In addition to the monomers listed above, the monosubstituted hydrophobic alkoxysilane precursor may be represented by the structure:

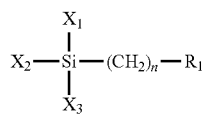

where n, $R_1$, $X_1$, $X_2$, and $X_3$ are as defined above.

In addition to the monomers listed above, the siloxyfluorocarbon networked polymer may be prepared using monomers selected from the group consisting of silicon tetraalkoxide and branched pentasilanes. The silicon tetraalkoxide is represented by the respective structure:

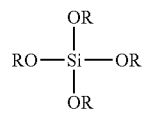

The branched pentasilanes are represented by the respective structure:

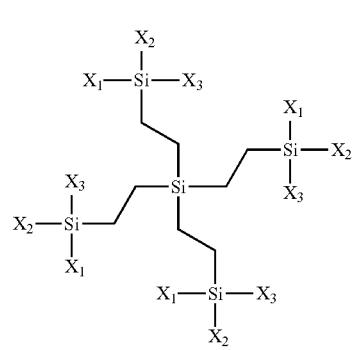

where $X_1$, $X_2$, and $X_3$ are as defined above.

The monomers may be networked together so that all monomers are molecularly bonded together in the cured coating via silicon oxide (Si—O—Si) linkages. Therefore, in embodiments, a molecular weight cannot be given for the siloxyfluorocarbon networked polymer because the coating may be cross-linked into one system.

In embodiments, the alkoxysilane precursors are processed via sol-gel processing (discussed below). In embodiments, weight percent of the monosubstituted alkoxy silanes is from 1 to about 50. The of the disubstituted alkoxy silanes is from about 1 weight percent to about 50 weight percent, or in embodiments from about 10 weight percent to about 40 weight percent of the formulation, or from about 15 weight percent to about 30 weight percent of the formulation. The coating to from about 30 weight percent to about 80 weight percent solids.

As discussed above, in embodiments, the instant disclosure provides a formulation composition to produce an organosiloxane (OSN) network composition, also referred to as a siloxyfluorocarbon networked polymer. In embodiments, the formulation composition may comprise a sol prepared from a mixture of monomers comprising at disubstituted alkoxysilanes and monosubstituted alkoxysilanes monomer; a solvent; a catalyst, and water. In embodiments, stable formulations may be produced by balancing the amount of monomer with the amount of catalyst, and by using a suitable amount of alcohol-based solvent. In embodiments, the formulation compositions may be applied to a substrate while in the sol phase, and gelation may occur upon standing or with heat treatment.

Sol-Gel Polymerization

Siloxyfluorocarbon monomers may be cross-linked via solution-gelation (or "sol-gel") chemistry, where hydrolysis and condensation of alkoxide or hydroxide groups occurs and upon curing at elevated temperatures, produces a cross-linked siloxane coating that may be used as a coating, such as for print head face plates. The cross-linked fluorinated siloxane coating prepared according to the instant disclosure can withstand high temperature conditions without melting or degradation, is mechanically robust under such conditions, and displays good release under such conditions.

A general process for forming sol-gels is discussed, for example, in C. J. Brinker & G. Scherer, Sol-Gel Science: The Physics and Chemistry of Sol-Gel Processing (Academic Press, Boston, 1990), and U.S. Patent Application Publication No. 2007/0082207, the disclosures of which are incorporated herein by reference in their entireties. This two-step reaction process, which transforms a miscible one-phase liquid solution into a two-phase material, is called "sol-gel transition." Generally, an alkoxysilane/solvent/water mixture is slow to hydrolyze. However, the hydrolysis rate is a function of the solution pH and, therefore, may be controlled by the addition of an acid or base as a catalyst. The reaction mixture can further include other materials, such as organic monomers or polymers or other additives, which can become either chemically bound into the polymer network or entrapped in the polymer structure.

The sol-gel polymerization processes according to the instant disclosure may be carried out at any suitable temperature, such as from about 25° C. to about 200° C., or from about 40° C. to about 150° C., or from about 65° C. to about 100° C.

The monomers are networked together so that all monomers are bonded together in the cured coating via silicon oxide (Si—O—Si) linkages. Therefore, a molecular weight cannot be given for the siloxyfluorocarbon networked polymer because the coating is cross-linked into one system.

In embodiments, one can use metal alkoxide (M=Si, Al, Ti, and so forth) functionalities as cross-linking components between fluorocarbon chains. For cross-linking to occur efficiently throughout the composite, bifunctional fluorocarbon chains are used. Mono-functional fluorocarbon chains can also be added to enrich fluorination content. $CF_3$-terminated chains align at the fusing surface to reduce surface energy and improve release.

Solvents used for sol-gel processing of siloxycarbon precursors and coating of layers include organic hydrocarbon solvents, and fluorinated solvents. Alcohols such as methanol, ethanol, and isopropanol are used to promote sol-gel reactions in solution. Further examples of solvents include ketones such as methyl ethyl ketone, and methyl isobutyl ketone. Mixtures of solvents may be used. In embodiments, the solvent may be an alcohol solvent. In embodiments, the alcohol solvent may be present in an amount of at least 20 weight percent of the formulation composition, such as from about 20 weight percent to about 70 weight percent, or from about 30 weight percent to about 50 weight percent of the formulation composition.

In embodiments, the solvent system may include the addition of a portion of water, such as from about 1 molar equivalent to 10 molar equivalents of water compared to siloxyfluorocarbon precursors or the siloxane terminated fluorocarbons, or from about 2 molar equivalents to about 6 molar equivalents of water.

Upon the addition of water to the solution of sol gel precursors, alkoxy groups react with water, and condense to form agglomerates that are partially networked, and are referred to as a sol. The sol may form a gel upon standing or upon drying.

In embodiments, the viscosity of the sol may be from about 1 centipoises (cPs) to about 10 cPs, such as from about 2 to about 9 cPs, or from about 3 to about 8 cPs, when the sol is prepared. In embodiments, the viscosity of the sol when the sol is applied to a substrate In embodiments, the sol may be applied to a substrate. Following coating of the sol onto a substrate, a gel may be formed upon standing or from drying with heat treatment, forming a fully networked siloxane coating on the substrate.

In embodiments, the cross-linked siloxane composition does not dissolve when exposed to solvents (such as ketones, chlorinated solvents, ethers etc.), does not degrade at temperatures up to 350° C., and is stable at higher temperatures, depending on the system.

In embodiments, the coating solution may be deposited on a substrate using any suitable liquid deposition technique. Exemplary methods for depositing the coating solution on the substrate include draw-down coating, spray coating, spin coating, flow coating, dipping, spraying such as by multiple spray applications of very fine thin films, casting, web-coating, roll-coating, extrusion molding, laminating, or the like. The thickness of the coating solution may be from about 100 nm to about 20 µm, such as from about 500 nm to about 10 µm, or from about 1 µm to about 5 µm.

As discussed above, stable formulation compositions may be produced by balancing the amount of monomer to the amount of catalyst, and by using a sufficient amount of solvent, such as alcohol-based solvent. In embodiments, a solution of monomers in ethanol or another alcohol, such as methanol or isopropanol, or a mixture containing alcohol, where the solvent is present in an amount of at least 20 weight percent of the formulation composition. The formulation composition may be prepared by adding water from about 1 molar equivalent to about 10 molar equivalents of water compared to siloxyfluorocarbon precursors or the siloxane terminated fluorocarbons, or from about 2 molar equivalents to about 6 molar equivalents of water, with a catalytic amount of acid or base to initiate networking. In embodiments, the catalyst is a hydroxide ion catalyst present in an amount of from about 0.1 mol % to about 5 mol % hydroxide ion per silicon atom, such as from about 0.2 mol % to about 3 mol %, or from about 0.3 mol % to about 1 mol %.

In embodiments, solids loading of from about 20 weight percent to about 80 weight percent, such as from about 30 weight percent to about 70 weight percent, or from about 40 weight percent to about 60 weight percent, may be employed.

In embodiments, the sol thus produced may be filtered prior to coating. In embodiments, the sol may also be subjected to a pre-curing step following filtration, such as by heating at a temperature of from about 40° C. to about 60° C., such as from about 45° C. to about 55° C., for from about 10 to about 45 minutes, such as from about 20 to about 40 minutes, or from about 25 to about 35 minutes. In embodiments, pre-curing may take place before the sol is coated onto a substrate. In embodiments, pre-curing may take place after the sol is coated onto a substrate.

In embodiments, the formulation composition may be coated on a surface. The formulation may be cured to yield a cross-linked siloxane layer on the surface. In such embodiments, the cross-linked siloxane layer has an increased adherence (such as a metal or polymer face plate) and increased wear resistance. In embodiments, the topcoat layer also exhibits little or no adhesion.

EXAMPLES

The following examples are being submitted to illustrate embodiments of the present disclosure. These examples are intended to be illustrative only and are not intended to limit the scope of the present disclosure. Parts and percentages are by weight unless otherwise indicated.

Chemistry and Coating:

Each surface layer was prepared according to the chemistry shown below. The formulations contained 20 weight percent, 30 weight percent and 50 weight percent of the monosubstituted perfluoroalkoxysilane (relative to the disubstituted silane (shown below as formula 1)). The iPr group in Formula 1 and 2 stands for isopropanol. The disubstituted perfluoroalkoxysilane is shown below as formula 2. The alkoxysilane mixture was dissolved in n-butanol and an equivalent of water and 0.5 mole percent to about 1 mole percent of hydroxide ion base was added to induce sol formation. The sol was filtered and drawn down and coated on Upilex® (polyimide) substrate yielding uniform fluorinated organosiloxane network (fOSN) coatings that provided excellent wetting of the polyimide. The fOSN coatings were dried at 50° C. for 15 minutes and cured at 180° C. for 1 hour yielding clear, colorless, high-quality, uniform films. The coatings had a thickness of from about 2 to 3 microns.

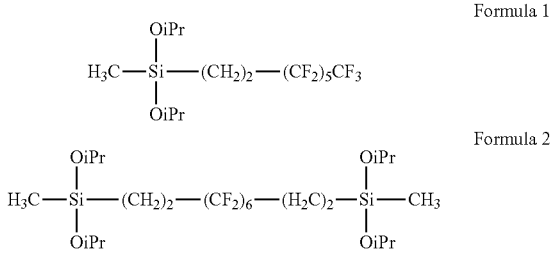

Examples were prepared by spin-coating the formulations described above onto glass substrates. The Examples were spin-coated onto glass substrates at 3000 rpm for 60 seconds and cured as above. The thickness was 500 nm. The thickness was determined by scratching the films and measuring the scratch height using a surface profilmeter.

The inclusion of monosubstituted PFAS increases the fluorine content (from 30 weight percent to 60 weight percent, depending on weight percent of PFAS and reduces the surface free energy. At 50 weight percent loading of PFAS the surface energy of the coating was 16.6 mN/m compared to 18 mN/m for Teflon.

The coatings were colorless, optically transparent and can be coated on wide range substrates including glass using a variety of processing techniques (spin-coating, flow coating, draw-down coating and spray coating). The coatings were mechanically robust and thermally robust as demonstrated by heating at 290° C. under pressure of about 300 psi, for 30 minutes with no observable cracking, wear or delamination.

Shown in FIG. 1 is a 500 nm thick SFC coating spin-coated on a quartz substrate and cured at 160° C. for 30 min. The coating is optically transparent, uniform and colorless.

An additional feature of this coating technology is that it integrates well with glass substrates forming a robust coating that is covalently linked to the glass surface. Flexible glass substrates such as Willow™ and Gorilla™ glass which are found in a multitude of consumer electronics (tablets, smart phones and LCD TVs) can be improved with the coating disclosed herein as an overcoat or protective surface layer.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A display comprising:
a transparent substrate; and
a transparent surface layer disposed on the transparent substrate wherein the transparent surface layer includes a siloxyfluorocarbon networked polymer comprising a first monomer represented by:

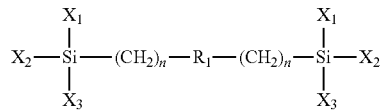

and a second monomer represented by:

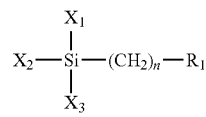

wherein n is from about 0 to about 4, $R_1$ is a linear or branched perfluorinated hydrocarbon group, a linear or branched partially fluorinated hydrocarbon group, a linear or branched perfluorinated polyether group, a linear or branched partially fluorinated polyether group, a linear or branched perfluorinated polyester group, a linear or branched partially fluorinated polyester group; and $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms, wherein the second monomer comprises from about 15 weight percent to about 30 weight percent of the transparent surface layer, wherein all monomers are bonded together via silicon oxide (Si—O—Si) linkages in a single system and wherein the siloxyfluorocarbon networked polymer is insoluble in solvents selected from the group consisting of ketones, chlorinated solvents and ethers.

2. The display according to claim 1, wherein the siloxyfluorocarbon networked polymer has a fluorine content of from about 30 weight percent to about 60 weight percent.

3. The display according to claim 1, wherein the surface layer has a surface free energy of less than 17 mN/m.

4. The display according to claim 1, wherein a thickness of the surface layer is from about 0.1 microns to about 4 microns.

5. The display according to claim 1, wherein a mole ratio of the second monomer to the first monomer is from 1 to 4 to about 1 to 1.

6. The display according to claim 1, wherein the siloxyfluorocarbon networked polymer further comprises silicon tetraalkoxide represented by the respective structure:

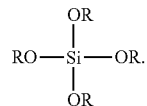

7. The display according to claim 1, wherein the siloxyfluorocarbon networked polymer further comprises branched pentasilanes represented by the respective structure:

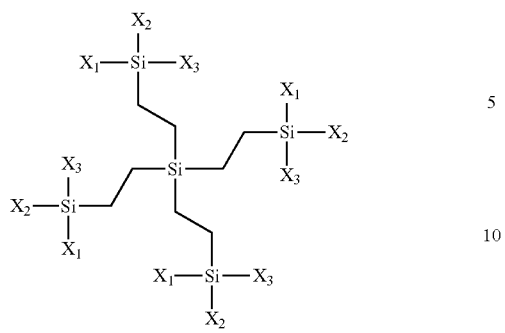
where $X_1$, $X_2$, and $X_3$ represent reactive hydroxide functionalities, reactive alkoxide functionalities, unreactive aliphatic functionalities of from about 1 carbon atom to about 10 carbon atoms, or unreactive aromatic functionalities of from about 1 carbon atom to about 10 carbon atoms.
* * * * *